(12) United States Patent
Araki et al.

(10) Patent No.: US 6,544,122 B2
(45) Date of Patent: *Apr. 8, 2003

(54) BACKGROUND-SOUND CONTROL SYSTEM FOR A VIDEO GAME APPARATUS

(75) Inventors: Shigeru Araki, Takatsuki (JP); Hideto Inoue, Ashiya (JP); Kazuhiko Uehara, Kobe (JP)

(73) Assignees: Konami Co., Ltd., Hyogo-ken (JP); Kabushi Kaisha Konami Computer Entertainment Osaka, Osaka-fu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/412,476

(22) Filed: Oct. 5, 1999

(65) Prior Publication Data

US 2002/0094865 A1 Jul. 18, 2002

(30) Foreign Application Priority Data

Oct. 8, 1998 (JP) .......................................... 10-303391

(51) Int. Cl.[7] .................................................. A63F 9/00
(52) U.S. Cl. .............................. 463/35; 463/30; 463/31; 381/16; 381/17; 381/18; 381/61; 381/123
(58) Field of Search ............................. 463/30–31, 35, 463/43–44; 381/61, 123, 17, 18

(56) References Cited

U.S. PATENT DOCUMENTS

| | | | | |
|---|---|---|---|---|
| 4,375,287 A | | 3/1983 | Smith ..................... 273/138 A |
| 5,026,051 A | * | 6/1991 | Lowe et al. ................. 273/435 |
| 5,052,685 A | * | 10/1991 | Lowe et al. ................. 273/460 |
| 5,138,660 A | * | 8/1992 | Lowe et al. ................... 381/17 |
| 5,390,938 A | * | 2/1995 | Takeya ....................... 273/434 |
| 5,393,073 A | | 2/1995 | Best ............................ 273/434 |
| 5,581,618 A | | 12/1996 | Satoshi et al. ................ 381/17 |
| 5,604,810 A | * | 2/1997 | Yanagawa .................... 381/63 |
| 5,633,985 A | * | 5/1997 | Severson et al. .......... 395/2.76 |
| 5,633,993 A | * | 5/1997 | Redmann et al. ........... 395/119 |
| 5,754,660 A | * | 5/1998 | Shimizu ...................... 381/17 |
| 5,768,393 A | * | 6/1998 | Mukojima et al. ............ 381/17 |
| 5,862,229 A | | 1/1999 | Shimizu |
| 5,977,471 A | * | 11/1999 | Rosenzweig ................. 84/633 |
| 5,993,318 A | * | 11/1999 | Kousaki ...................... 463/35 |
| 6,111,959 A | * | 8/2000 | Taylor ......................... 381/17 |
| 6,330,486 B1 | | 12/2001 | Padula |

FOREIGN PATENT DOCUMENTS

| | | |
|---|---|---|
| EP | 0725354 | 1/1995 |
| JP | 07-178224 | 7/1995 |
| JP | 08-149600 | 6/1996 |
| JP | 10-211358 | 8/1998 |
| WO | WO94/17515 | 8/1994 |

OTHER PUBLICATIONS

U.S. Ser. No. 09/412,477, filed Oct. 5, 1999, Shigeru Araki et al. for "Background–Sound Switching Apparatus, Background–Sound Switching Method, Readable Recording Medium with Recording Background–Sound Switching Program, and Video Game Apparatus".

* cited by examiner

*Primary Examiner*—Joe H. Cheng
*Assistant Examiner*—Carmen D. White
(74) *Attorney, Agent, or Firm*—Jordan and Hamburg LLP

(57) ABSTRACT

A background-sound control apparatus, a background-sound control method, readable recording medium containing a background-sound control program, and a video game apparatus improve effectiveness of background-sound data provided over a predetermined number of channels. When background sounds are produced through a speaker, a sound-level controller controls output ratios for sound levels defined in background-sound data on a channel basis and uses a sound-level control function to perform crossfading sound-level control.

36 Claims, 9 Drawing Sheets

BACKGROUND-SOUND CONTROL SYSTEM FOR A VIDEO GAME APPARATUS

BACKGROUND OF THE INVENTION

1. Field of the Invention

The present invention relates to a background-sound control apparatus, a background-sound control method, and a readable recording medium containing a background-sound control program is recorded, which control background sounds created corresponding to variations of events to be displayed in display means.

2. Description of the Related Art

Hitherto, a system for displaying variation of an event, for example, in a video game, has been known. In this system, generally, background sounds created corresponding to images to be displayed on display means are outputted through a speaker so as to improve effectiveness of the images displayed on the display means. For example, in a video game, background sounds produced corresponding to game images are outputted through a speaker so as to improve the simulation realism of the game. Generally, these background sounds are composed using multiple channels, and various quasisounds defined for the individual channels are combined into composite sounds and outputted through the speaker.

In the conventional system described above, however, the number of channels for composing the background sound cannot be infinitely increased because it relates to the number of output ports, control load, and the like in a CPU, which is control means. Generally, the number of channels is predetermined, and the background sound is composed using quasisounds of the predetermined number of channels; therefore, effectiveness of the background sound must be improved within the restricted number of the channels.

SUMMARY OF THE INVENTION

In view of the above problems, an object of the present invention is to provide a background-sound control apparatus, a background-sound control method, a readable recording medium containing a background-sound control program, and a video game apparatus which allow effectiveness of the background sound to be improved within the predetermined number of channels.

To achieve the above, according to one aspect of the present invention, there is provided a background-sound control apparatus that has display means for displaying variations of events, the events displayed in the display means varying according to operations performed on operating means; sound-generating means for generating background sounds; background-sound-data storing means containing background-sound data including data of sound levels corresponding to the event; output control means for outputting the background-sound data to the sound-generating means to generate the background sound; and sound-level control means for varying output ratios of the sound levels of the background sound corresponding to variations of the events.

According to this configuration, the event variations are displayed on the display means, background-sound data is outputted to the sound-generating means, and the background sound is generated therein. At this time, since the output ratios of the sound levels of the background sound are varied corresponding to the variation of the event, effectiveness of the background sound can be improved without increasing the number of channels for the background sound.

According to this configuration in which the event variations are displayed on the display means, the background-sound data corresponding to the events are concurrently outputted to the sound-generating means, resulting in generation of the background sound. In this, since output ratios of sound levels of the background sound vary corresponding to the event variations, effectiveness of the background sound can be improved without increasing the number of channels for the background sound.

Also, in the background-sound control apparatus as described above, the events displayed in the display means may vary according to operations performed on operating means.

According to this arrangement, since the output ratios of the levels of the background sound vary according to the variation in the operations performed on the operating means, effectiveness of the background sound corresponding to the operation can be improved.

Also, in the above-described background-sound control apparatus, the background-sound data may be composed of multiple channels, and the sound-level control means may vary the output ratios for the individual channels.

According to this configuration in which the output ratios are varied for the individual channels, effectiveness of the background sound can be further improved without increasing the number of channels for the background sound.

Also, in the above-described background-sound control apparatus, the display means may display images of various types, and the sound-level control means may vary the output ratios according to variations of display images.

According to this configuration in which the output ratios are varied according to the variations of the display images, effectiveness such as the background sound varying according to the variations of the display images can be obtained, by which effectiveness of the background sound can be further improved without increasing the number of channels for the background sound.

Also, in the above-described background-sound control apparatus, the sound-level control means may vary the output ratios as time passes.

According to this configuration in which the output ratios are varied as time passes, for example, the output ratios are gradually varied, by which the background sound provides effectiveness to notify a game player of the passing time, and effectiveness of the background sound can be further improved.

Also, the above-described background-sound control apparatus may have start-instruction means for outputting a predetermined start signal, in which the sound-level control means inverts highness/lowness of the output ratios of a predetermined number of channels and other channels among the plurality of channels as time passes from a moment when the start signal is outputted.

According to this configuration, in which highness/lowness of the output ratios of a predetermined number of channels and other channels among the plurality of channels is inverted as time passes from a moment when the start signal is outputted, the background sound provides effectiveness to notify the game player of the passing time, and effectiveness of the background sound can be further improved.

Also, in the above-described background-sound control apparatus, the sound-level control means may maintain the output ratios of the predetermined number of channels at a first level and maintain the output ratios of the other channels at a second level which is higher than the first level until the start signal is outputted.

According to this arrangement in which, until the start signal is outputted, the output ratios of the predetermined number of channels are maintained at a first level, for example, at 0%, and the output ratios of the other channels are maintained at a second level, for example, at 100%, which is higher than the first level. This provides effectiveness such as the background sound pieces being increased by a predetermined number of the channels within the predetermined multiple channels. Therefore, effectiveness of the background sound can be further improved.

Also, the background-sound control apparatus may further have function-storing means containing a first function representing a value increasing sharply from 0% as time passes and a second function representing a value decreasing gradually from 100% as time passes, in which the sound-level control means increases the output ratios of the predetermined number of channels according to the first function and decreases the output ratios of the other channels according to the second function.

According to this configuration, the output ratios of the predetermined number of channels increase sharply, for example, from 0% as time passes; the output ratios of the other channels decrease gradually from, for example, from 100% as time passes. This allows switching of the background sound to be clearly perceived by the ear.

Also, the above-described background-sound control apparatus may further have code-detecting means, switching instruction means, and switching control means, in which the background-sound-data storing means stores multiple pieces of background-sound data having partitioning codes in predetermined partitioning positions; the code-detecting means detects the partitioning codes of background-sound data being outputted to the sound-generating means; the switching instruction means outputs an instruction signal which causes switching from background-sound data to be outputted to the sound-generating means to the other background-sound data; and the switching control means switches from the background-sound data being outputted to the sound-generating means to other background-sound data in synchronization with detection of the partitioning code to be detected following output of the instruction signal.

According to this configuration, in which the background-sound data being outputted to the sound-generating means is switched to the other background-sound data in synchronization with detection of the partitioning code to be detected following output of the instruction signal, unnatural changes which may be felt when the boundary of switching of the background sound is perceived by the ear can be prevented.

Also, in the above-described background-sound control apparatus, the background-sound data may include music data, and the partitioning code may be provided at the end position of a phrase of the music data.

According to this configuration in which switching is performed when the phrase of the background-sound data finishes, unnatural changes, which may be felt when the boundary of switching of the background sound is perceived by the ear, can be prevented.

Also, in the above-described background-sound control apparatus, other background-sound data may include sound data of the predetermined number of channels of the background-sound data being outputted to the sound-generating means.

According to this configuration, in which the other background-sound data includes sound data of the predetermined number of channels of background-sound data being outputted to the sound-generating means, the sound of the predetermined number of channels continues even after the background-sound data is switched. This makes it further difficult to perceive the switching boundary of the background-sound data by the ear.

According to another aspect of the present invention, there is provided a background-sound control method, in which the output ratio of the sound levels of the background-sound data varies according to the event variations when the background-sound data including the sound levels stored in the background-sound-data storing means corresponding to variations of events to be displayed on the display means is outputted to the sound-generating means for generating background sounds.

According to this configuration, in which the event variations are displayed on the display means, and concurrently, the background-sound data corresponding to the events is outputted and generated as the background sound, the output ratios of the sound levels of the background sound vary corresponding to the event variations, and effectiveness of the background sound can be improved without increasing the number of channels for the background sound.

According to yet another aspect of the present invention, there is provided a readable recording medium containing a background-sound control program having a varying step of varying output ratios of sound levels of background-sound data corresponding to variations of events displayed on the display means when outputting the background-sound data including data of sound levels which is stored in background-sound-data storing means for generating background sounds.

When a computer reads the program in the readable recording medium and executes it, the event variations are displayed on the display means, the background-sound data corresponding to the events is outputted to the sound-generating means, and the background sound is generated. In this, according to the arrangement in which the output ratios of the sound levels vary corresponding to the event variations, effectiveness of the background-sound data can be improved without increasing the number of channels for the background sound.

Also, according to still another aspect of the present invention, there is provided a video game apparatus that has the background-sound control apparatus as described above, program-storing means containing a game program, externally-operable operating means, and display control means for controlling images displayed on the display means according to the game programs.

According to this configuration, images of various types are displayed on the display means according to the game program, the background-sound data corresponding to the images is outputted, and the background sound is generated. In this case, according to the arrangement in which the output ratios of the levels of the background sound vary corresponding to display control performed by the display control means, effectiveness of the background sound can be improved, and the simulation effects of the game images can also be improved.

The present invention provides advantages as summarized below.

According to the background-sound control apparatus, the background-sound control method, and the readable recording medium, when background-sound data corresponding to events is outputted to sound-generating means and background sounds are generated, variations of events are displayed on display means, and output ratios of sound levels of the background sound are varied corresponding to the event variations, by which effectiveness of the background sound can be improved without increasing the number of channel for the background sound.

Also, the background-sound control apparatus provides the following advantages:

(1) The output ratios are varied for the individual channels, and effectiveness of the background sound can be further improved without increasing the number of channels.

(2) Since output ratios are varied according to variations of display images, effectiveness such as that the background sound varies according to the variations of the display images can be obtained, by which effectiveness of the background sound can be further improved without increasing the number of channels for the background sound.

(3) Since the output ratios are varied as time passes, effectiveness to allow the passing time to be known can be obtained, by which effectiveness of the background sound can be further improved.

(4) Highness/lowness of the output ratios of a predetermined number of channels and other channels is inverted as time passes from a moment when the start signal is outputted, by which effectiveness of notifying of the passing time can be obtained, and effectiveness of the background sound can be further improved.

(5) Since the output ratios of the predetermined number of channels are maintained at a first level, and the output ratios of the other channels are maintained at a second level which is higher than the first level until the start signal is outputted, effectiveness such as that the background sound pieces are increased by a predetermined number of the channels within predetermined multiple channels can be obtained, by which effectiveness of the background sound can be further improved.

(6) The output ratios of the predetermined number of channels are increased sharply from 0% as time passes, and the output ratios of the other channels are reduced gradually from 100% as time passes, by which switching of the background sound can be clearly perceived by the ear.

(7) The background-sound data being outputted to the sound-generating means is switched to the other background-sound data in synchronization with detection of the partitioning code to be detected following output of the instruction signal, by which switching is performed at predetermined partitioned positions so as to prevent unnatural changes which may be felt when the boundary of switching is clearly perceived by the ear.

(8) A partitioning code is provided at the end position of a phrase of the music data, by which switching is performed at a moment when the phrase of the background-sound data finishes. Therefore, unnatural changes, which may be felt when the boundary of switching is clearly perceived by the ear, can be prevented.

(9) The other background-sound data includes sound data of the predetermined number of channels of the background-sound data being outputted to sound-generating means. By this, the sound of the predetermined number of channels continues even after the background-sound data is switched, making it further difficult to perceive the switching boundary of the background-sound data by the ear, thereby allowing the background-sound data to be switched more smoothly.

Also, according to the video game apparatus, images of various types are displayed on display means according to a game program; and when the background-sound data corresponding to the images is outputted, and the background sound is generated, the output ratios of the levels of the background sound are varied corresponding to display control by display control means. By this, effectiveness of the background sound can be improved, and simulation effects of the game images can be improved.

Also, according to the background-sound control apparatus, events displayed in display means vary according to operations performed on operating means, by which the levels of the background sound vary according to the variation in the operations performed on the operating means; therefore, effectiveness of the background sound corresponding to the operation can be improved.

DESCRIPTION OF THE PREFERRED EMBODIMENT

Figure 1:
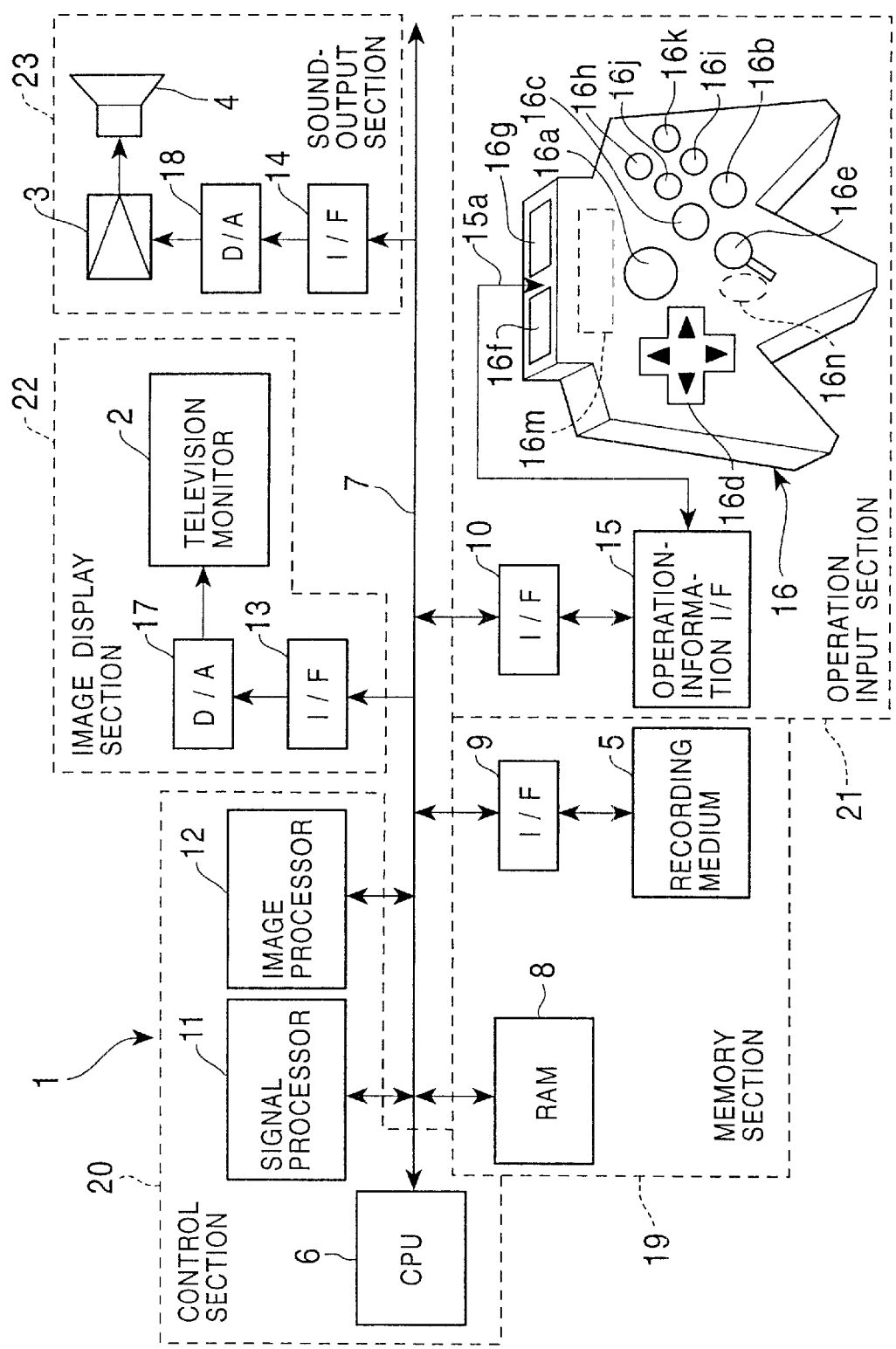
FIG. 1 is a configuration view of an embodiment of a game system according to the present invention.

FIG. 1 is a configuration view showing a game system 1 as an embodiment of the present invention. The game system 1 is constituted of a game-machine main assembly; a television monitor 2 (which is called a "monitor", hereinbelow) as display means for displaying game screens; an amplifier circuit 3 and a speaker 4 (sound-generating means) for outputting game sounds; and a recording medium 5 in which image data, sound data, and a game program composed of program data are recorded. The recording medium 5 is, for example, a so-called cassette ROM, an optical disk, or a flexible disk that is housed in a plastic package, in which program data for, for example, the aforementioned game program and an operating system are stored.

The game-machine main assembly is configured such that a bus 7 composed of an address bus, a data bus, and a control bus are connected to a CPU 6; a RAM 8, an interface circuit 9, an interface circuit 10, a signal processor 11, an image processor 12, an interface circuit 13, and an interface circuit 14 are individually connected to the bus 7; a controller 16 is connected to the interface circuit 10 via an operation-information interface circuit 15; a D/A converter 17 is connected to the interface circuit 13; and a D/A converter 18 is connected to the interface circuit 14.

In this, the RAM 8, the interface circuit 9, and the recording medium 5, as described above, constitute a memory section 19; the aforementioned CPU 6, the signal processor 11, and the image processor 12, as described above, constitute a control section 20 that controls the game progress; the interface circuit 10, the operation-information interface circuit 15, and the controller 16, as described above, constitute an operation-input section 21; the monitor 2, the interface circuit 13, and the D/A converter 17 constitute an image display section 22; and the amplifier circuit 3, the speaker 4, the interface circuit 14, and the D/A converter 18 constitute a sound-output section 23.

The signal processor 11 mainly performs computations in a three-dimensional space, computation for positional transformation from a three-dimensional space to a pseudo-three-dimensional space, computation of light sources, and generation and processing of sound data.

The image processor 12 performs writing of image data, that is, writing of texture data, which is to be written in a display area of the RAM 8.

The controller 16 has externally-operable operating means including a start button 16a, an A-button 16b, a B-button 16c, a cross key 16d, a stick-type controller 16e, a left trigger button 16f, a right trigger button 16g, a C1 button 16h, a C2 button 16i, a C3 button 16j, a C4 button 16k, and a depth trigger button 16n, and sends signals corresponding to operations effected on the individual buttons to the CPU 6.

The stick-type controller 16e has substantially the same arrangement as a joystick. That is, it has a stick installed upright therein, which is bendable in a direction of 360° around a predetermined support point, including the left-right and back and forth directions. Conforming to the bend direction and bend angle of the stick, an x-coordinate value in the left-right direction and a y-coordinate value in the back and forth direction, both coordinates being based on the original upright position, are arranged to be sent to the CPU 6 via the interface circuits 15 and 10.

The controller 16 also has a connector 16m from which, for example, a card-type memory for temporarily memorizing, for example, the game progress status, is detachable.

The game system 1, as described above, varies in configuration according to its use. For home-use configuration of the game system 1, the television monitor 2, the amplifier circuit 3, and the speaker 4 are spaced from the game-machine main assembly. For commercial-use configuration of the game system 1, however, all the components shown in FIG. 1 are integrally stored in a single housing.

Also, when the game system 1 is configured on the basis of a personal computer or a workstation as a nucleus, the television monitor 2 corresponds to a display unit of the computer; the image processor 12 corresponds to part of the game program data recorded in the recording medium 5 or hardware on an expansion board mounted on an expansion slot of the computer; and interface circuits 9, 10, 13, and 14, D/A converters 17 and 18, and the operation-information interface circuit 15 correspond to the hardware on the expansion board mounted on the expansion slot of the computer. Also, the RAM 8 corresponds to a main memory or individual areas of an expansion memory of the computer.

In this embodiment, a description will be given taking an example case where the game system 1 is configured for home use.

Hereinbelow, an overall operation of the game system 1 is described below.

When a power switch (not shown) is turned on, and the game system 1 is powered on, the CPU 6 performs reading of image data and sound data, and the game program from the recording medium 5 in accordance with an operating system stored in the recording medium 5. All or some of the data read out are transferred to the RAM 8 to be stored therein. Subsequently, the CPU 6 commands the game to proceed on the basis of the game program data contained in the RAM 8 and the type of instructions a game player issues using the controller 16. In particular, the CPU 6 generates commands as tasks for, for example, creating images and outputting sounds, according to operation signals sent from the controller 16 as and when required by instructions the game player issues using the controller 16.

In response to the above-described commands, the signal processor 11 performs computations such as character-position computation and light-source computation in a three-dimensional space (the same as in a two-dimensional space, as a matter of course), and in addition, functions as output control means for performing generation of sound data. On the basis of results of the aforementioned computations, the image processor 12 performs writing of image data that must be drawn in a display area of the RAM 8, and the like. The D/A converter 17 converts the image data written in the RAM 8 to an analog signal in every predetermined cycle via the interface circuit 13 and then displays the signal as an image on a tube face of the monitor 2. On the other hand, the data which has been outputted from the signal processor 11 is fed, via the interface circuit 14, to the D/A converter 18 in which the data is converted to an analog signal, and the signal is then outputted from the speaker 4 via the amplifier circuit 3 as sounds.

Figure 2:
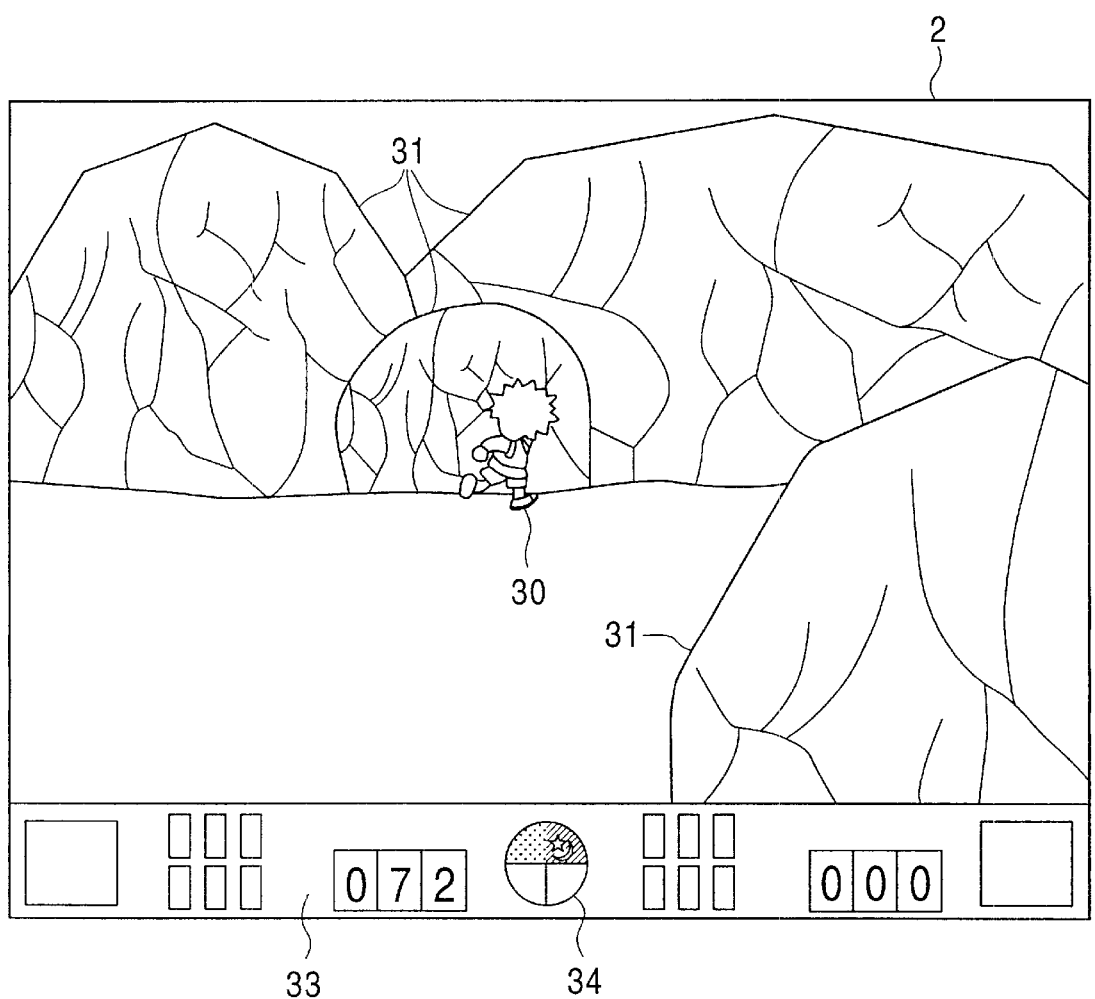
FIG. 2 is a view of a screen of a video game.
Figure 3:
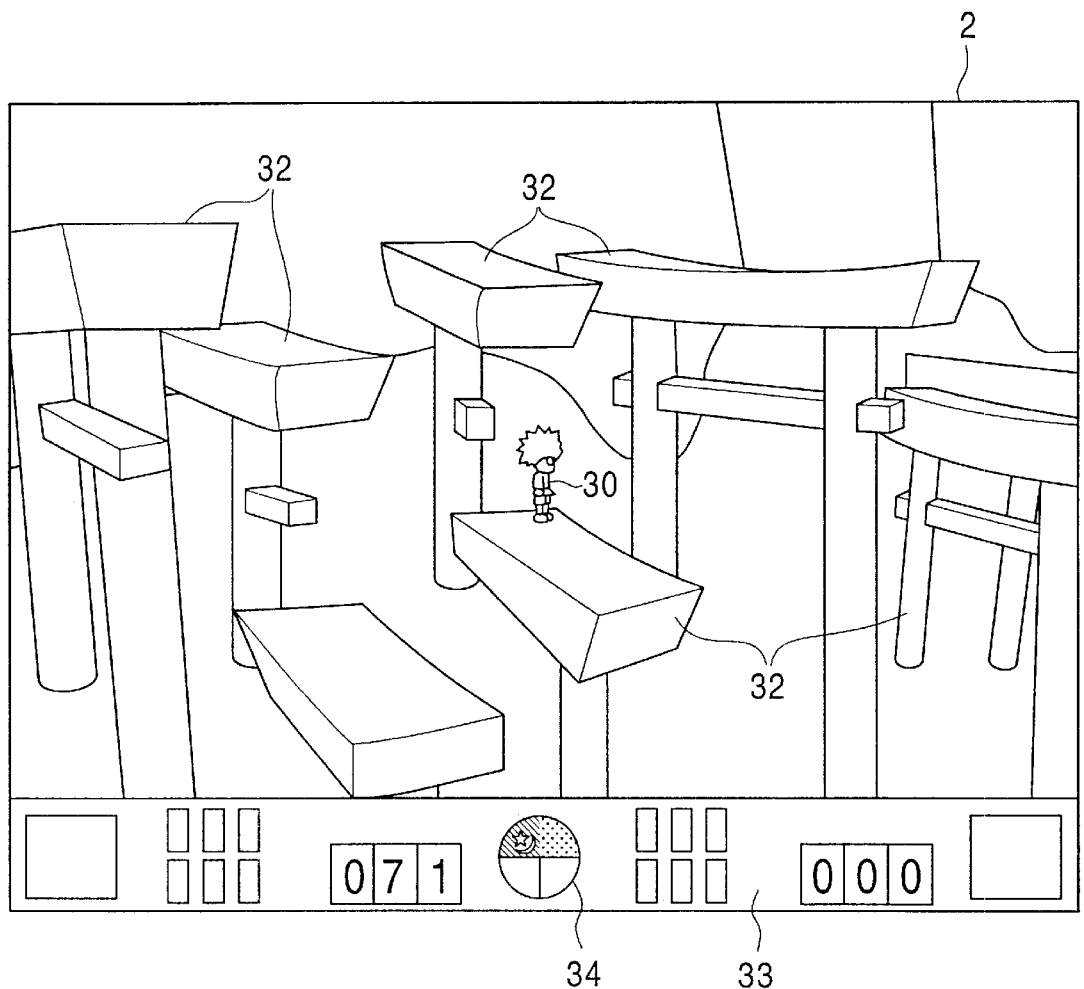
FIG. 3 is a view of another screen of the video game.

Hereinbelow, referring to FIGS. 2 and 3, a description will be given of an outline of a video game to be executed by the game program recorded in the recording medium 5. FIGS. 2 and 3 each show a screen of the game.

This video game is such that, according to the operations performed by a game player on the controller 16 by a game player, a leading character performs actions such as battles with an opponent character, and obtains items so as to satisfy predetermined conditions to be cleared in a game stage, whereby the game proceeds to the next stage.

As shown in FIGS. 2 and 3, a leading character 30 is displayed substantially in the center of the screen of the monitor 2, and around the leading character 30, as models representing geometrical shapes and structural elements. FIG. 2 shows a display of rock models 31, and FIG. 3 shows a display of a shrine-gateway models 32. Also, the lower portion of the monitor 2 displays weapon items the leading character 30 is to carry and a game-status display section 33 for displaying a life gage.

Also, in this video game, game time that runs at a predetermined rate according to the passing game time is set, and a daytime/nighttime status display section 34 is provided in the game-status display section 33. In the daytime/nighttime status display section 34, display contents of the upper semicircular section are rotated clockwise around the center of a circular display section, and colors ranging from light blue to white (which are displayed by reticulate dots in FIGS. 2 and 3) indicate daytime, and a star and crescent marks indicate nighttime. In this way, according to the display status in the upper semicircular section, the daytime/nighttime status of the game time is identifiably displayed. For example, the daytime/nighttime status display section 34 in FIG. 2 indicates early morning time, and the daytime/nighttime status display section 34 in FIG. 3 indicates evening time.

The running rate of the game time is set independently of the game stage that proceeds according to the type of operation effected on the controller 16. Therefore, even in the same game screen, the daytime/nighttime status differs depending on the rate of operation effected on the controller 16.

Figure 4:
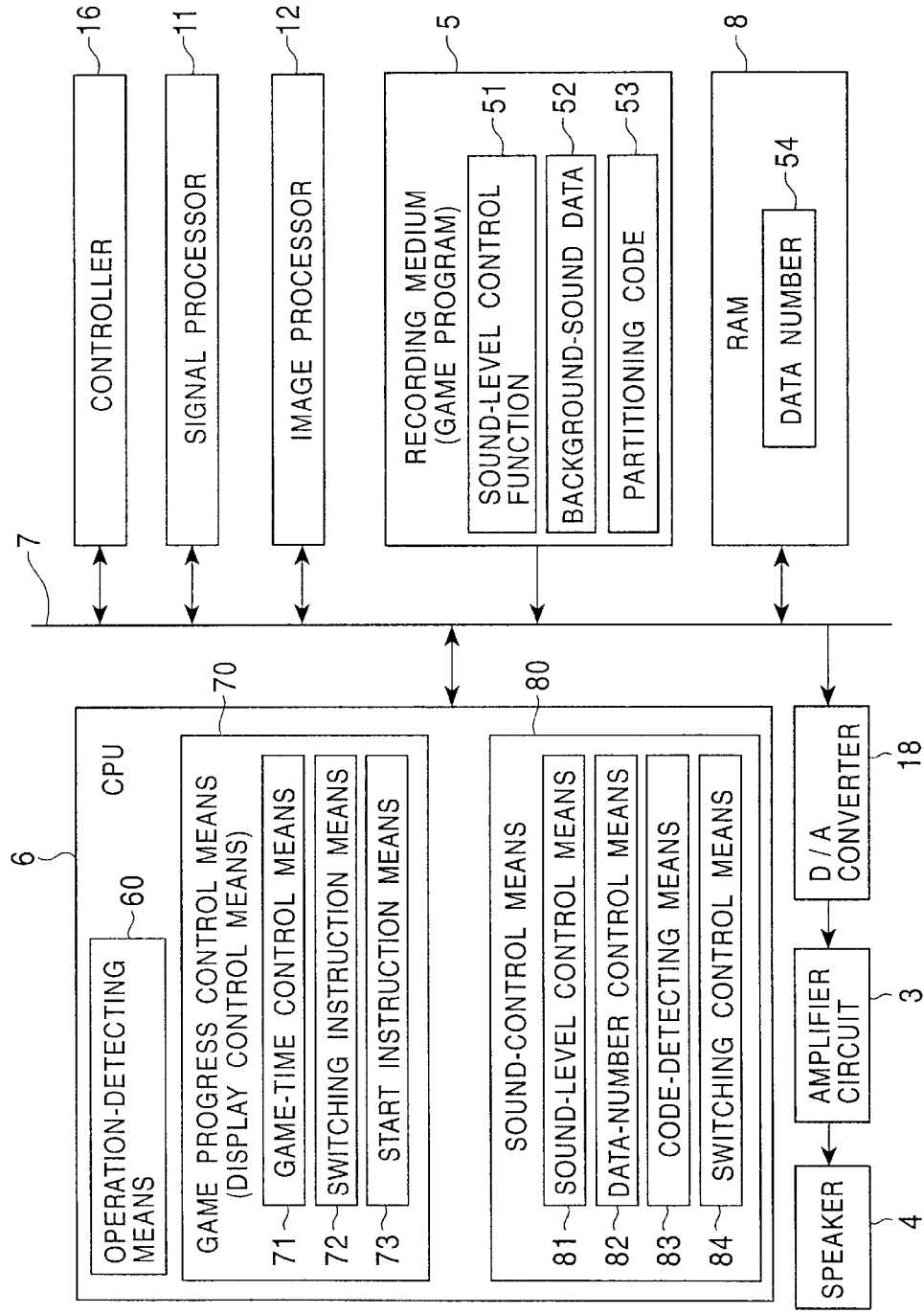
FIG. 4 is a schematic view of major portions in FIG. 1 and of functional blocks.
Figure 5:
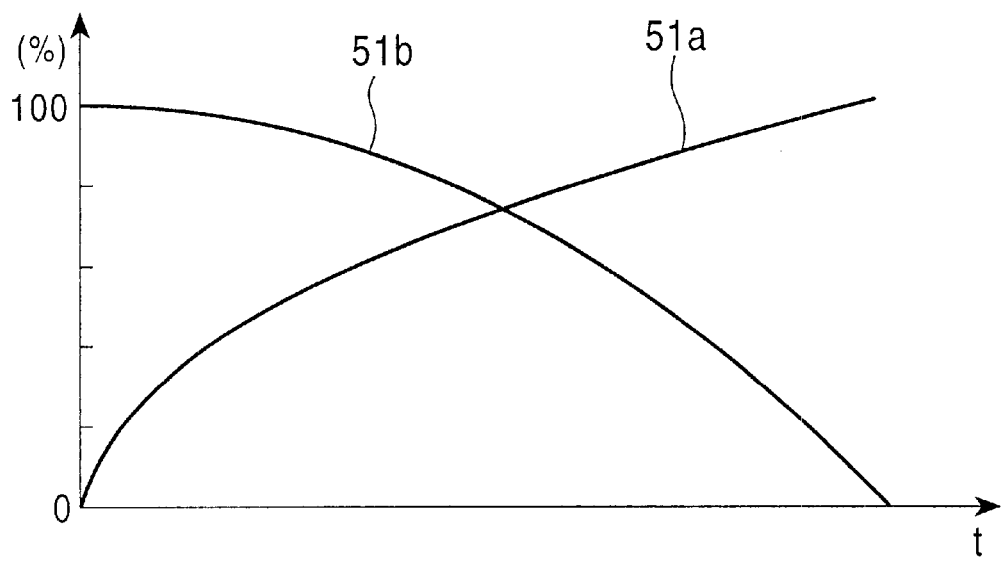
FIG. 5 is an illustration of sound-level control functions.
Figure 6:
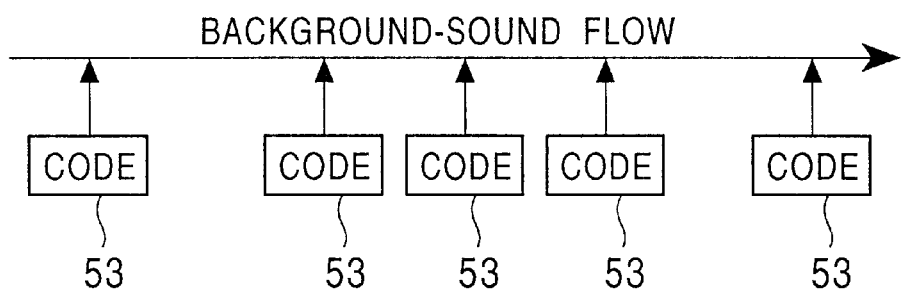
FIG. 6 is a drawing to be used for explaining partitioning codes.

FIG. 4 is a schematic view showing function blocks of the CPU 6 and main portions in FIG. 1. FIG. 5 is a drawing showing sound-level control functions. FIG. 6 is a drawing illustrative of partitioning codes.

As described above, the recording medium 5 contains the game program. It also contains data such as a sound-level control function 51, multiple pieces of background-sound data 52, and partitioning codes 53 as part of the game program. In this invention, the recording medium 5 is also referred to as function-storing means or background-sound-data storing means.

As described below, the sound-level control function 51 is used in computation of data to produce output ratios of sound levels predetermined with the background-sound data 52 when the background-sound data 52 is outputted to the D/A converter 18, and a first function 51$a$ and a second function 51$b$ as shown in FIG. 5 are stored in the recording medium 5.

The first function 51$a$ is predefined so that the output ratio increases sharply from 0%, and thereafter, increases gradually up to 100%. The second function 51$b$ is predefined so that the output ratio decreases gradually from the output ratio of 100%, and thereafter sharply decreases from 100%. In this embodiment, quadratic functions are used as the first and second functions 51$a$ and 51$b$.

For the multiple pieces of background-sound data 52, for example, the background-sound data for the nighttime and the background-sound data of daytime are prepared individually according to game stages and game times. The background-sound data 52 is composed of a plurality of channels, and quasisounds, such as a "Japanese drum", a "bass", and a "synthesizer sound", are composed in the individual channels.

The partitioning code 53 represents the end position of a phrase of the background sound (the natural division of a melody flow) outputted from the speaker 4, as shown in FIG. 6. A data number 54 of the other background-sound data is temporarily stored in the RAM 8 when background-sound data being outputted to the D/A converter 18 is switched to other background-sound data. The RAM 8 is also referred to as standby-data storing means.

The CPU 6 controls operations of individual system-configuration elements according to the game program. It has operation-detecting means 60, game-progress control means 70, and sound control means 80. The operation-detecting means 60 detects the type of game-player operation of the controller 16 according to an operation signal sent from the controller 16. The game-progress control means 70 controls the game progress according to the type of operation of the controller 16 and the game program, and concurrently, has a function for controlling images displayed on the monitor 2. In addition, as functional blocks, the game-progress control means 70 includes game-time control means 71, switching instruction means 72, and start instruction means 73. The sound control means 80 generates a sound-outputting command for the background sound and effect sounds; and as functional blocks, it has sound-level control means 81, data-number control means 82, code-detecting means 83, and switching control means 84.

The game-time control means 71 in the game-progress control means 70 runs the game time at a predetermined rate according to the elapsed game time, and also controls the display contents of the daytime/nighttime status display section 34.

The switching instruction means 72 outputs a switching instruction signal which causes switching from the background-sound data being output to the D/A converter 18 at such a moment when the game stage is switched or the daytime/nighttime status is changed either from daytime to nighttime or from nighttime to daytime. The start instruction means 73 outputs a start signal that instructs start of crossfading sound-level control, which is described below, when the game time passes to a predetermined point. The sound-level control means 81 in the sound control means 80 controls the output ratio on the basis of the channels when background-sound data is outputted through the speaker 4 according to the sound level set in the background-sound data 52.

Upon the output of the switching instruction signal, the data-number control means 82 stores the data number 54 defining the background-sound data 52 in a predetermined area of the RAM 8. The code-detecting means 83 detects the partitioning code 53 appended to the background-sound data 52 being outputted to the D/A converter 18.

The switching control means 84 has the following functions:

(1) A function as data-number determining means that determines whether or not the data number 54 defining the background-sound data 52 is stored in the predetermined area of the RAM 8 after each detection of the partitioning code 53.

(2) A function as data switching means that switches from the background-sound data 52 being outputted to the D/A converter 18 to other background-sound data 52 to be defined by the data number 54 when the data number 54 defining the background-sound data 52 is stored in the predetermined area of the RAM 8.

Figure 7:
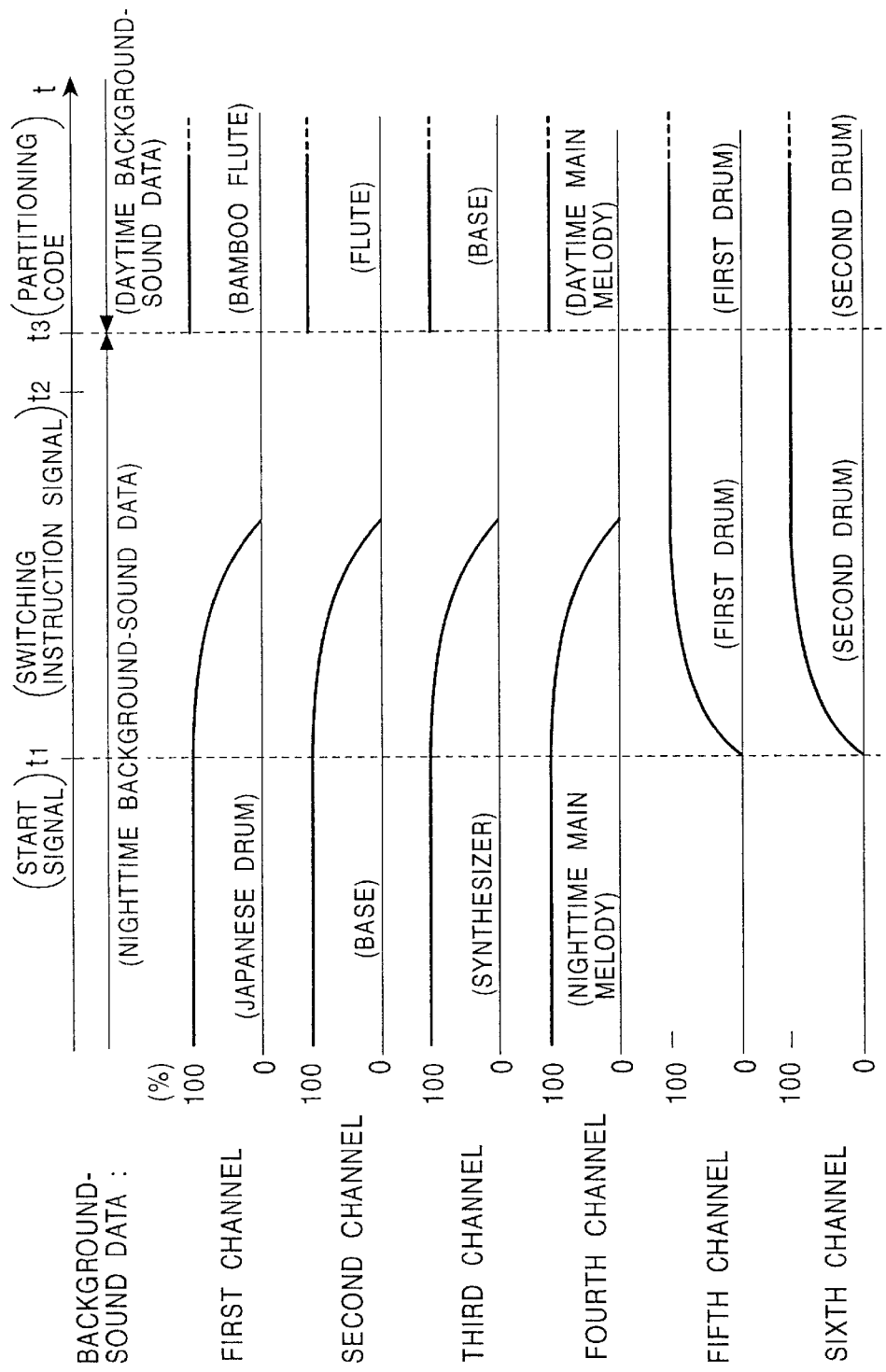
FIG. 7 shows timing-charts indicating output ratios for individual channels for sound levels defined in background-sound data.

Hereinbelow, referring to FIGS. 5 and 7, a description will be given of crossfading sound-level control to be performed by the sound-level control means 81. FIG. 7 shows timing charts indicating output ratios of individual channels for sound levels defined in the background-sound data. FIG. 7 shows a case where the daytime/nighttime status of the game proceeds from nighttime to daytime, and the outputted background-sound data is switched from nighttime background-sound data to daytime background-sound data.

In this embodiment, the individual background-sound data is composed of six channels, which are a first channel to a sixth channel. The individual pieces of nighttime background-sound data are composed of quasisounds of, for example, a "Japanese drum", a "bass", a "synthesizer", a "nighttime main melody", a "first drum", and a "second drum". The individual pieces of daytime background-sound data are composed of quasisounds of, for example, a "bamboo flute", a "flute", a "bass", a "daytime main melody", a "first drum", and a "second drum".

As FIG. 7 shows, as output ratios of the individual channels of the nighttime background-sound data for the defined sound level, those for the first channel to the fourth channel are maintained at 100% from the beginning, and those for the fifth channel and the sixth channel are maintained at 0% from the beginning. When a start signal is outputted at a time $t_1$, crossfading sound-level control is performed according to the sound-level control function 51. That is, output ratios of the first channel to the fourth channel are reduced from 100% according to the second function 51$b$; and output ratios of the fifth channel and the sixth channel are increased from 0% according to the first function 51$a$. When the game time proceeds, a switching instruction signal is outputted at a predetermined time $t_2$, and thereafter, a partitioning code is detected at a time $t_3$, the nighttime background-sound data is switched synchronously to the daytime background-sound data, and the output ratios of the individual channels in the daytime background-sound data are maintained at 100%.

In the above case, the "first drum" of the fifth channel and the "second drum" of the sixth channel are continuously used in the fifth channel and the sixth channel of the daytime background-sound data. Therefore, the background sound to be outputted through the speaker 4 changes gradually from the time $t_1$. This allows the background sound to be suitably switched.

Also, the background sound is switched in synchronous with detection of the partitioning code appended to each phrase. In this case, since the background sound does not suddenly switch but switches naturally, even when the background-sound data is switched, the boundary cannot be perceived by the ear. Thus, switching of the background-sound data can be smoothly performed, thereby allowing switching of the background-sound data to be performed even more suitably.

In this embodiment, from the time when the start signal is outputted, output ratios of the first channel to the fourth channel are gradually reduced from 100%, and output ratios of the fifth channel and the sixth channel are increased sharply from 0%. According to experiments by the inventor and others, compared to the case where the individual channels are linearly increased or reduced, switching of the background sound to be outputted through the speaker 4 can be determined even more clearly.

Figure 8:
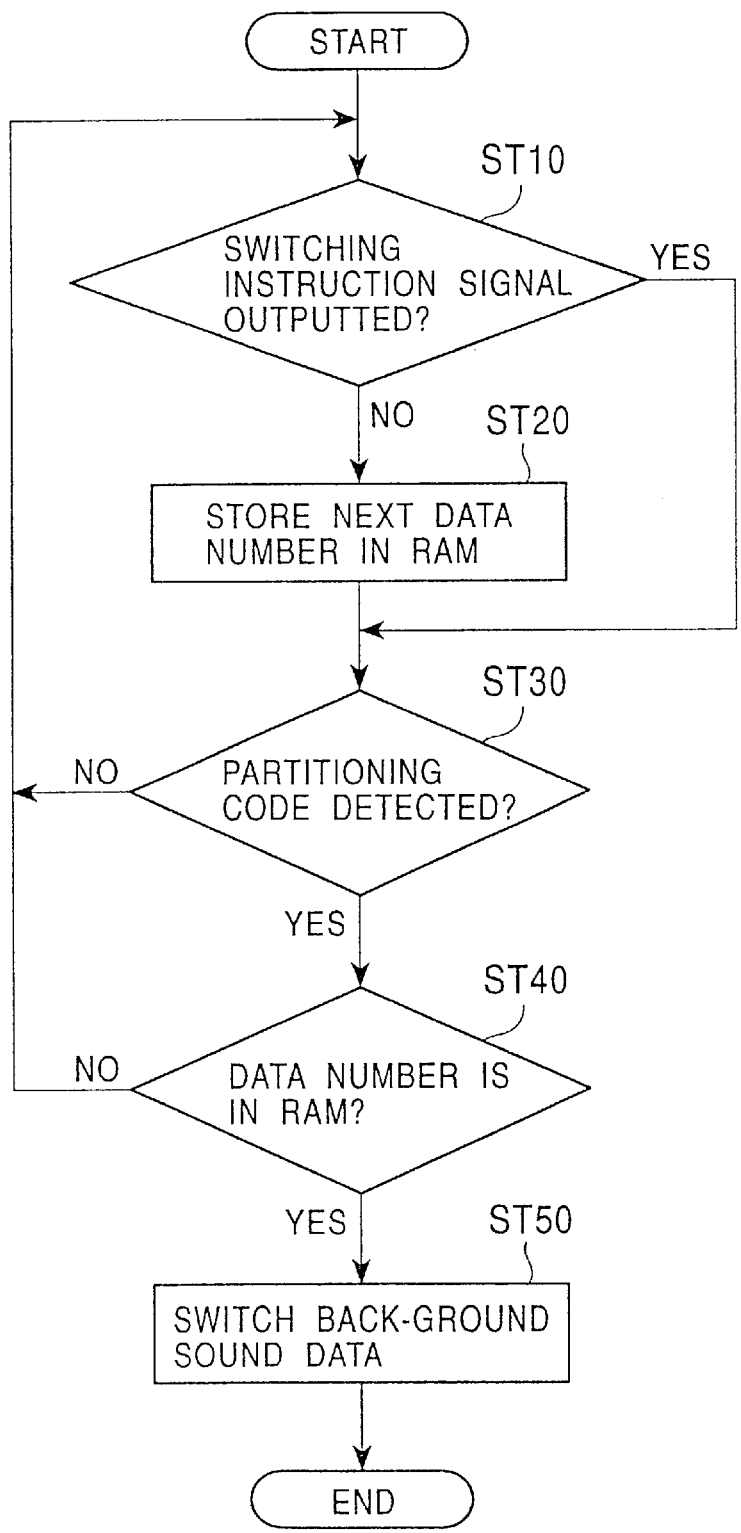
FIG. 8 is a flowchart of operation steps of a background-sound switching program.

Hereinbelow, referring to the flowchart in FIG. 8, a description will be given of operation steps of a background-sound switching program, which switches the background-sound data.

The program determines whether or not a switching instruction signal has been outputted according to progress in the game time, the game, and the like (step ST10). If the switching instruction signal is outputted (YES in step ST10), a data number defining the next background-sound data is stored in the RAM 8 (step ST20). If the switching instruction signal is not outputted (NO in step ST10), control proceeds to step ST30.

Subsequently, the program determines whether or not a partitioning code is detected in the background-sound data currently being outputted (step ST30). If a partitioning code is detected (YES in step ST30), the program determines whether or not a data number is stored in the RAM 8 (step ST40). If a data number is stored (YES in step ST40), the background-sound data is switched (step ST50). If a partitioning code is not detected (NO in step ST30), or if a data number is not stored in the RAM 8 (NO in step ST40), control returns to step ST10.

Figure 9:
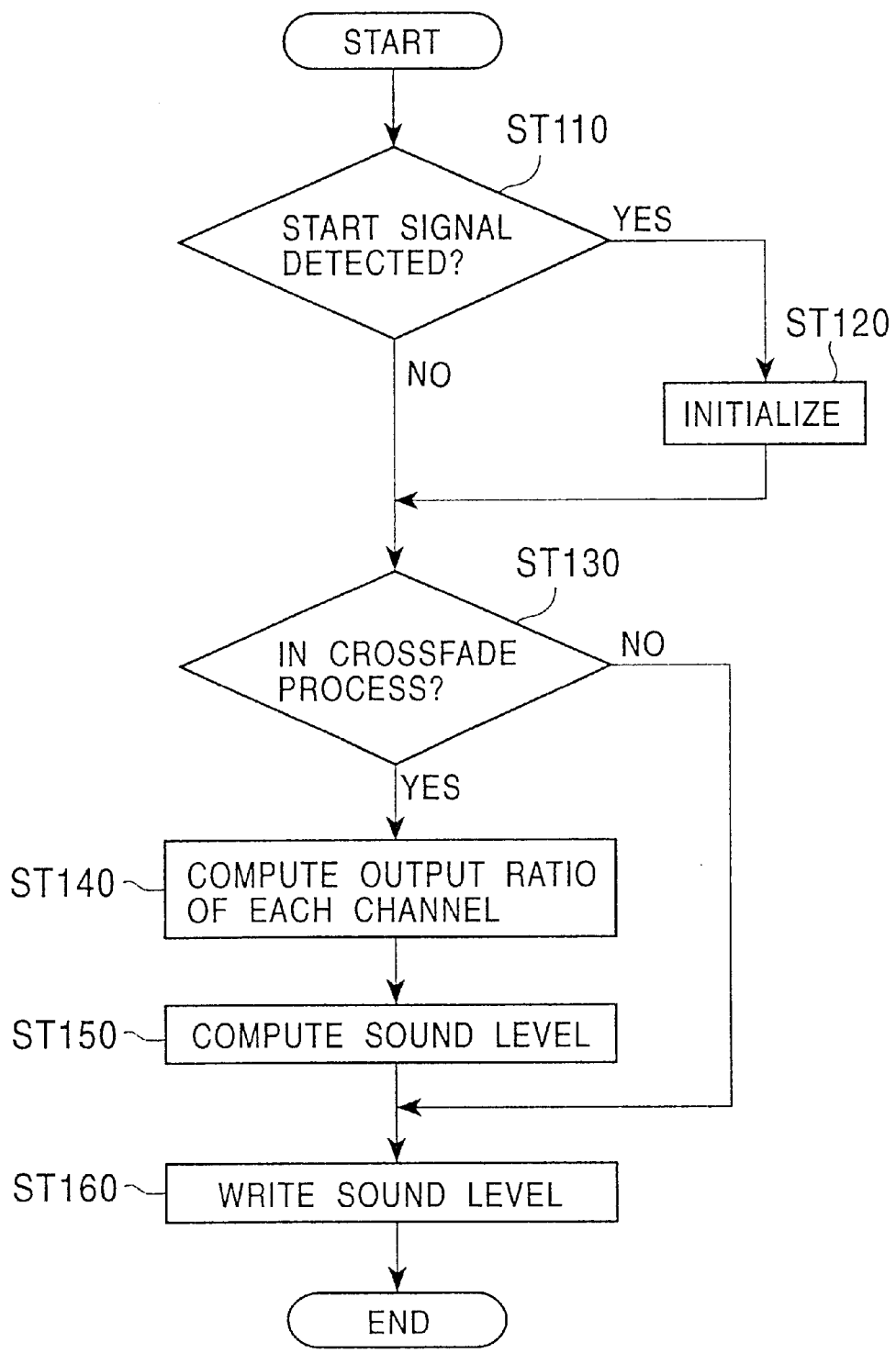
FIG. 9 is a flowchart of operation steps of a background-sound control program for crossfading sound-level control.

Hereinbelow, referring to the flowchart in FIG. 9, a description will be given of operation steps of a background-sound control program for the crossfading sound-level control by the sound control means 80. This routine is executed as a process-interrupting routine in each predetermined cycle.

First, the program determines whether or not a start signal for the crossfading sound-level control is outputted (step ST110). If the start signal is outputted (YES in step ST110), initialization is performed for the crossfading sound-level control, a flag representing that the crossfading sound-level control is in progress is set (step ST120), and control proceeds to step ST130.

If the start signal is not outputted (NO in step ST110), the program determines whether or not the crossfading sound-level control is already being processed (step ST130). If the crossfading sound-level control is in process (YES in step ST130), output ratios of the individual channels are computed by using the sound-level control function 51 from a passing time from the time when the start signal is outputted (step ST140). That is, in the example in FIG. 7, output ratios of the first channel to the fourth channel are computed according to the second function 51b, and output ratios of the fifth channel and the sixth channel are computed according to the second function 51b.

Subsequently, sound levels for the individual channels are computed using the computed output ratios. In specific, absolute values representing sound levels that must be outputted through the speaker 4 are computed (step ST150), the computed sound levels for the individual channels are written into predetermined areas of the RAM 8, and then this routine ends.

If the crossfading process is not in progress in step ST130 (NO in step ST130), default sound levels set in the background-sound data are written for individual channels (step ST160). Then, this routine ends.

In this way, according to this embodiment, output ratios of sound levels of the first to fourth channels are maintained at 100%, and output ratios of sound levels of the fifth and sixth channels are maintained at 0%. In this, when the start signal is outputted, the output ratios of the first to fourth channels are reduced, and concurrently, the crossfading sound-level control is performed to increase the output ratios of the fifth and sixth channels. This allows smooth switching background-sound data to be outputted through the speaker 4 from nighttime background-sound data to daytime background-sound data. In this way, switching of the background-sound data can be performed suitably.

Also, switching of the background-sound data can be performed so as to be heard even more easily. This can be achieved when the daytime background-sound data after switching is arranged to include quasisound data which has been set in the firth and sixth channels increased by the crossfading process from the pre-switching state to 100% set.

Also, the partitioning code 53 representing the end position of the phrase of the background-sound data is provided, and the background-sound data is switched synchronously at the time when the partitioning code 53 is detected. This prevents unnatural changes which may be felt when the background sound is switched during processing of a phrase, and the boundary of switching is perceived by the ear. In this way, background-sound data can be suitably switched.

Also, since a prefixed sound source such as that implemented for recording media, for example, CD-ROMs, is not used, the background sound can be generated in the real time depending on the game status.

The present invention is not restricted to the above embodiment and may employ modifications described below.

(1) In the above embodiment, as the first and second functions 51a and 51c, quadratic functions are used. However, there is no such restriction. As long as the first function 51a allows the output ratio to increase sharply from 0% and allows the second function 51b to decrease gradually from 100%, the functions may be trigonometric functions, exponential functions, logarithmic functions, or other functions.

(2) In the above embodiment, the background-sound data is switched according to the game time. However, there is no such restriction. The background-sound data may be switched, for example, in each change of the game stage, such as places where the main character battles the opponent character, and stairs in a castle and a building.

(3) In the above embodiment, the output ratio of each channel is either increased or reduced. However, there is no such restriction. The output ratio of the sound level of a predetermined channel may be increased or reduced according to the game status relevant to, for example, the number of opponent characters.

Figure 10:
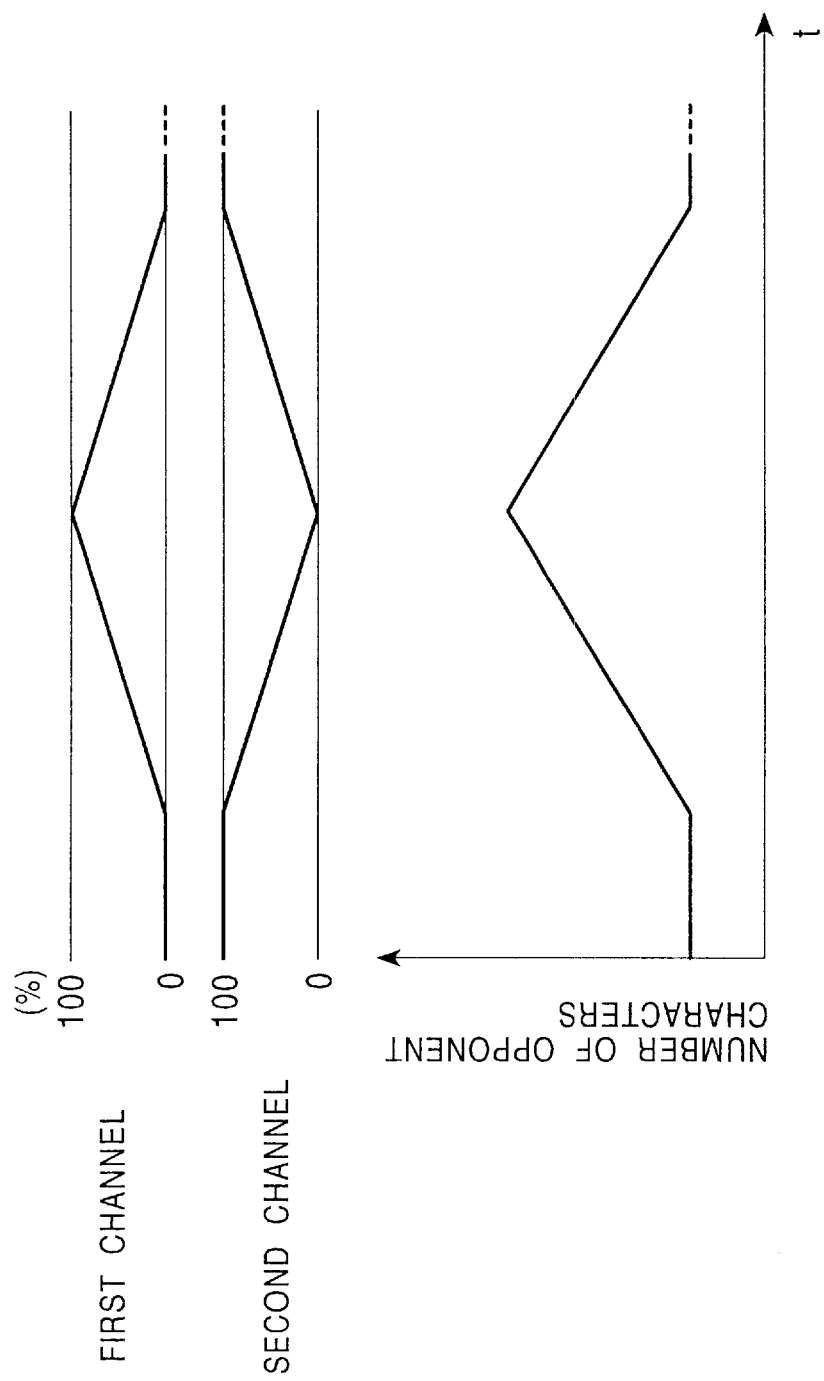
FIG. 10 shows timing-charts of another example of the sound-level control.

For example, in FIG. 10, when the number of opponent characters increases, the output ratio of the first channel increases, and concurrently, the output ratio of the second channel decreases. Also, when the number of opponent characters decreases, the output ratio of the first channel decreases, and concurrently, the output ratio of the second channel increases. In the case of FIG. 10, for the sound-level control function 51, a function allowing the output ratio to increase and decrease in the range of 0% to 100% is preferably set. In this case, the number of channels of background-sound data is not restricted to the number shown in FIGS. 7 and 10, and the number may be at least one. According to this mode of the invention, even when the number of CPU-usable output ports is restricted, whereby the number of channels of the background-sound data is restricted, variation can be provided in the background sound. This allows effectiveness of the background sound to be improved.

(4) The above embodiment is a video game apparatus which the game player operates. However, there is no such restriction. The apparatus may be an image-creating apparatus that outputs background sounds corresponding to images displayed on the monitor 2. Also, the display means is not restricted to the image display apparatuses, such as a monitor, and other display means of various types, such as mechanical, optical, and acoustic types may be considered to be used. The display means includes, for example, the type for a so-called "mole-whacking game". In this case, variation in popping-up of moles, the popping-up rate, the popping-up count, and the like, is displayed as the event variation.

(5) In the described embodiment, the first channel to the fourth channel are faded out to be silent and are then switched. However, there is no such restriction. The channels may be switched before they are faded out to be silent. In this case, the background-sound data before or after switching is set so that the background sound can be heard naturally.

(6) In the described embodiment, the output ratio of the background-sound data is varied according to the variation in the game time. However, there is no such restriction. The output ratio may be varied according to variation of the image displayed on the monitor 2, and variation of the operations performed on the controller 16. Also, the output ratio may be varied according to variation of an event such as moles that pop up in the case of the so-called mole-whacking game.

(7) Switching of the background-sound data may be varied according to variation of the operation effected on the controller 16. Also, the switching may be varied according to the variation-of an event such as moles popping up as in the mole-whacking game.

What is claimed is:

1. A background-sound control apparatus comprising:
    display means for displaying variations of events, the events displayed in the display means varying according to operations performed on operating means;
    sound-generating means for generating background sounds using a plurality of channels;
    background-sound-data containing means containing background-sound data including at least a first background sound for at least a first channel and a second channel, and at least a second background sound, different form the first background sound, the first background sound and the second background sound corresponding to respective ones of the events;
    output control means for outputting the background-sound data to the sound-generating means to generate the first and second background sounds;
    sound level control function means for defining a variation of output levels of the first background sound and the second background sound; and
    sound-level control means for, in response to the variation of events, effecting the following:
        first varying an output ratio of the output levels of the first channel to the second channel of the first background sound by decreasing the output level of the first channel while increasing the output level of the second channel in accordance with the output levels defined by the sound level control function means to generate the variation of the output ratio; and
        following the variation of the output ratio, setting the output level of the second background sound to a given level to generate the second background sound and ending generation of the first background sound.

2. A background-sound control apparatus as claimed in claim 1, wherein the background-sound data is composed of a plurality of channels, and the sound-level control means varies output ratios for individual channels of the plurality of channels.

3. A background-sound control apparatus as claimed in claim 1, wherein the display means displays images of various types, and the sound-level control means varies the output ratios according to variations of display images.

4. A background-sound control apparatus as claimed in claim 2, wherein the display means displays images of various types, and the sound-level control means varies the output ratios according to variations of display images.

5. A background-sound control apparatus as claimed in claim 1, wherein the sound-level control means varies the output ratio as time passes.

6. A background-sound control apparatus as claimed in claim 2, wherein the sound-level control means varies the output ratios as time passes.

7. A background-sound control apparatus as claimed in claim 1, comprising start-instruction means for outputting a predetermined start signal, wherein the sound-level control means varies output ratios of a predetermined number of channels and other channels among the plurality of channels as time passes from a moment when the start signal is outputted.

8. A background-sound control apparatus as claimed in claim 7, wherein the sound-level control means maintains the output ratios of the predetermined number of channels at a first level and maintains the output ratios of the other channels at a second level which is higher than the first level until the start signal is outputted.

9. A background-sound control apparatus as claimed in claim 6, further comprising function-storing means containing a first function representing a value increasing sharply from 0% as time passes and a second function representing a value decreasing gradually from 100% as time passes, wherein the sound-level control means increases output levels of a predetermined number of said plurality of channels according to the first function and decreases output levels of other channels according to the second function.

10. A background-sound control apparatus according to claim 5, further comprising code-detecting means, switching instruction means, and switching control means, wherein the background-sound-data storing means stores multiple pieces of background-sound data having partitioning codes in predetermined partitioning positions;

the code-detecting means detects the partitioning codes of the background-sound data being outputted to the sound-generating means;

the switching instruction means outputs an instruction signal which causes switching from background-sound data for the first background sound to be outputted to the sound-generating means to other background-sound data for the second background sound; and the switching control means switches from the background-sound data for the first background sound to the other background-sound data for the second background sound in synchronization with a detection of the partitioning code to be detected following output of the instruction signal.

11. A background-sound control apparatus according to claim 6, further comprising code-detecting means, switching instruction means, and switching control means, wherein the background-sound-data storing means stores multiple pieces of background-sound data having partitioning codes in predetermined partitioning positions;

the code-detecting means detects the partitioning codes of background-sound data being outputted to the sound-generating means;

the switching instruction means outputs an instruction signal which causes switching from background-sound data for the first background sound to be outputted to the sound-generating means to other background-sound data for the second background sound; and the switching control means switches from the first background sound to the second background sound in synchronization with detection of the partitioning code to be detected following output of the instruction signal.

12. A background-sound control apparatus according to claim 7, further comprising code-detecting means, switching instruction means, and switching control means, wherein the background-sound-data storing means stores multiple pieces of background-sound data having partitioning codes in predetermined partitioning positions;

the code-detecting means detects the partitioning codes of background-sound data being outputted to the sound-generating means;

the switching instruction means outputs an instruction signal which causes switching from background-sound data for the first background sound to be outputted to the sound-generating means to other background-sound data for the second background sound; and the switching control means switches from the first background sound to the second background sound in synchronization with detection of the partitioning code to be detected following output of the instruction signal.

13. A background-sound control apparatus as claimed in claim 8, wherein the background-sound data includes music data; and a partitioning code is provided at the end position of a phrase of the music data.

14. A background-sound control apparatus as claimed in claim 8, wherein background-sound data for said second background sound includes sound data of the predetermined number of channels of the background-sound data being outputted to the sound-generating means.

15. A background-sound control apparatus as claimed in claim 9, wherein background-sound data for said second background includes sound data of the predetermined number of channels of the background-sound data being outputted to the sound-generating means.

16. A video game apparatus comprising the background-sound control apparatus as claimed in claim 1, program-storing means containing a game program, externally-operable operating means, and display control means for controlling images displayed on the display means according to the game programs.

17. A video game apparatus comprising the background-sound control apparatus as claimed in claim 2, program-storing means containing a game program, externally-operable operating means, and display control means for controlling images displayed on the display means according to the game programs.

18. A video game apparatus comprising the background-sound control apparatus as claimed in claim 3, program-storing means containing a game program, externally-operable operating means, and display control means for controlling images displayed on the display means according to the game programs.

19. A video game apparatus comprising the background-sound control apparatus as claimed in claim 4, program-storing means containing a game program, externally-operable operating means, and display control means for controlling images displayed on the display means according to the game programs.

20. A video game apparatus comprising the background-sound control apparatus as claimed in claim 5, program-storing means containing a game program, externally-operable operating means, and display control means for controlling images displayed on the display means according to the game program.

21. A video game apparatus comprising the background-sound control apparatus as claimed in claim 6, program-storing means containing a game program, externally-operable operating means, and display control means for controlling images displayed on the display means according to the game program.

22. A video game apparatus comprising the background-sound control apparatus as claimed in claim 7, program-storing means containing a game program, externally-operable operating means, and display control means for controlling images displayed on the display means according to the game program.

23. A video game apparatus comprising the background-sound control apparatus as claimed in claim 8, program-storing means containing a game program, externally-operable operating means, and display control means for controlling images displayed on the display means according to the game program.

24. A video game apparatus comprising the background-sound control apparatus as claimed in claim 9, program-storing means containing a game program, externally-operable operating means, and display control means for controlling images displayed on the display means according to the game program.

25. A video game apparatus comprising the background-sound control apparatus as claimed in claim 10, program-storing means containing a game program, externally-operable operating means, and display control means for controlling images displayed on the display means according to the game program.

26. A background-sound control apparatus comprising:

display means for displaying variations of events, the events displayed in the display means varying according to operations performed on operating means;

sound-generating means for generating background sounds;

background-sound-data containing means containing background sound data including a first background-sound data and a second background-sound data corresponding respectively to first and second events;

output control means for outputting the background-sound data to the sound-generating means to generate background sounds;

sound level control function means including:
a first mathematical function which produces a first output level value decreasing initially at a first rate from 100% as time passes and decreasing finally at a second rate, greater than said first rate, to 0%; and
a second mathematical function which produces a second output level value increasing initially at a third rate from 0% as time passes and increasing finally at a fourth rate, less than said first rate, to 100% wherein said first rate is less than said third rate and said second rate is greater than said fourth rate;
and
sound-level control means for, in response to change from the first event to the second event, simultaneously varying sound levels of the first background sound data and the second background sound data in accordance with the first and second output level values of the first and second mathematical functions, respectively, to generate variation of an output ratio of the sound levels.

27. The background-sound apparatus according to claim 26, further comprising a plurality of channels, wherein the first background-sound data and the second background-sound data are played by the plurality of channels, respectively, and the sound-level control means varies outputs of the plurality of channels playing the first background sound data and the second background data according to the output ratio of the first and second output sound levels.

28. The background-sound apparatus according to claim 26, wherein the display means displays various images and the sound-level control means vanes the output ratio according to variations of the various images.

29. The background-sound apparatus according to claim 27, further comprising:
code-detecting means;
switching instruction means; and
switching control means, wherein
the background-sound-data-containing means includes partitioning codes in predetermined partitioning positions;
the code-detecting means detects the partitioning codes outputted to the sound generating means;
the switching instruction means outputs an instruction signal which causes switching from the first background-sound data outputted to the sound-generating means to the second background-sound data; and
the switching control means switches from the first background-sound data outputted to the sound-generating means to the second background sound data in synchronization with detection of the partitioning code to be detected following output of the instruction signal by decreasing output of the first background sound according to the first mathematical function while increasing output of the second background sound according to the second mathematical function.

30. A video game apparatus comprising:
a program storing means containing a game program;
an externally-operable operating means;
a display means for displaying variations of events, the events displayed in the display means varying according to operations performed on the operating means;
a display control means for controlling images displayed on the display means according to the game program; and
a background-sound control apparatus including:
sound-generating means for generating background sounds;
background-sound-data containing means containing background sound data including a first background-sound data and a second background-sound data corresponding respectively to first and second events;
output control means for outputting the background-sound data to the sound-generating means to generate background sounds;
sound level control function means including:
a first mathematical function which produces a first output level value decreasing initially at a first rate from 100% as time passes and decreasing finally at a second rate, greater than said first rate, to 0%; and
a second mathematical function which produces a second output level value increasing initially at a third rate from 0% as time passes and increasing finally at a fourth rate, less than said first rate, to 100% wherein said first rate is less than said third rate and said second rate is greater than said fourth rate;
and
sound-level control means for, in response to change from the first event to the second event, simultaneously varying sound levels of the first background sound data and the second background sound data in accordance with the first and second output level values of the first and second mathematical functions, respectively, to generate variation of an output ratio of the sound levels.

31. A background-sound control apparatus comprising:
display means for displaying variations of events, the events displayed in the display means varying according to operations performed on operating means;
sound-generating means for generating background sounds;
background-sound-data containing means containing background sound data including a first background-sound data and a second background-sound data corresponding respectively to first and second events;
output control means for outputting the background-sound data to the sound-generating means to generate background sounds;
sound level control function means including:
a first mathematical function which produces a first output level value decreasing initially at a first rate from 100% as time passes and decreasing finally at a second rate, greater than said first rate, to 0%; and
a second mathematical function which produces a second output level value increasing initially at a third rate from 0% as time passes and increasing finally at a fourth rate, less than said first rate, to 100% wherein said first rate is less than said third rate and said second rate is greater than said fourth rate;

and
sound-level control means for, in response to change from the first event to the second event, simultaneously varying sound levels of the first background sound data and the second background sound data in accordance with the first and second output level values of the first and second mathematical functions, respectively, to generate variation of an output ratio of the sound levels.

32. The background-sound apparatus according to claim 31, further comprising a plurality of channels, wherein the first background-sound data and the second background-sound data are played by the plurality of channels, respectively, and the sound-level control means varies outputs of the plurality of channels playing the first background sound data and the second background data.

33. The background-sound apparatus according to claim 32, further comprising:
code-detecting means;
switching instruction on means; and
switching control means, wherein
the background-sound-data-containing means includes partitioning codes in predetermined partitioning positions;
the code-detecting means detects the partitioning codes outputted to the sound generating means;
the switching instruction means outputs an instruction signal which causes switching from the first background-sound data outputted to the sound-generating means to the second background-sound data; and
the switching control means decreases output of the first background-sound data outputted to the sound-generating means while increasing output of the second background sound data in synchronization with detection of the partitioning code to be detected following output of the instruction signal.

34. A video game apparatus comprising:
a program storing means containing a game program;
an externally-operable operating means;
a display means for displaying variations of events, the events displayed in the display means varying according to operations performed on the operating means;
a display control means for controlling images displayed on the display means according to the game program; and
a background-sound control apparatus including:
sound-generating means for generating background sounds;
background-sound-data containing means containing background sound data including a first background-sound data and a second background-sound data corresponding respectively to first and second events;
output control means for outputting the background-sound data to the sound-generating means to generate background sounds;
sound level control function means including:
a first mathematical function which produces a first output level value decreasing initially at a first rate from 100% as time passes and decreasing finally at a second rate, greater than said first rate, to 0%; and
a second mathematical function which produces a second output level value increasing initially at a third rate from 0% as time passes and increasing finally at a fourth rate, less than said first rate, to 100% wherein said first rate is less than said third rate and said second rate is greater than said fourth rate;
and
sound-level control means for, in response to change from the first event to the second event, simultaneously varying sound levels of the first background sound data and the second background sound data in accordance with the first and second output level values of the first and second mathematical functions, respectively, to generate variation of an output ratio of the sound levels.

35. A background-sound control apparatus comprising:
display means for displaying variations of events, the events displayed in the display means varying according to operations performed on operating means;
sound-generating means for generating a first background sound and a second background sound different from the first background sound;
background-sound-data containing means containing background sound data including:
a first background sound data composed of a plurality of individual sounds corresponding to a first event; and
a second background sound data composed of a plurality of individual sounds corresponding to a second event;
output control means for outputting the background-sound data to the sound-generating means to generate the first background sound and second background sound;
sound level control function means for defining a variation of output levels of the first background sound data and the second background sound data;
the switching instruction means for outputting a switching instruction signal in accordance with a variation of events of to switch from the first background sound data to the second background sound data; and
sound-level control means for, in response to the switching instruction signal, effecting the following:
first varying an output ratio of output levels of one of the plurality of individual sounds of the first background sound data to another one of the individual sounds of the first background sound data by decreasing the output level of the one of the plurality of individual sounds while increasing the output level of the another one of the individual sounds of the first background sound in accordance with the output levels defined by the sound level control function means to generate the variation of the output ratio; and
following the variation of the output ratio, setting the output level of the second background sound data to a given level to generate the second background sound and ending generation of the first background sound data.

36. A background-sound control apparatus comprising:
display means for displaying variations of events, the events displayed in the display means varying according to operations performed on operating means;
sound-generating means for generating a first background sound and a second background sound different from the first background sound;
background-sound-data containing means containing background sound data including:

a first background sound data composed of at least a first sound and a second sound respectively to be output on a first channel and a second channel; and
a second background sound data;

output control means for outputting the background sound data to the sound-generating means to generate the first background sound and second background sound;

sound level control function means for defining a variation of output levels of the first background sound data and the second background sound data, the sound level control function means including:
 a first mathematical function which produces a first output level value decreasing initially at a first rate from 100% as time passes and decreasing finally at a second rate, greater than said first rate, to 0%; and
 a second mathematical function which produces a second output level value increasing initially at a third rate from 0% as time passes and increasing finally at a fourth rate, less than said first rate, to 100% wherein said first rate is less than said third rate and said second rate is greater than said fourth rate;

the switching instruction means for outputting a switching instruction signal in accordance with a variation of events of to switch from the first background sound data to the second background sound data; and sound-level control means for, in response to the switching instruction signal, effecting the following:
 first varying an output ratio of output levels of the first sound of the first background sound data to the second sound of the first background sound data by decreasing the output level of the first sound in accordance with the first output value while increasing the output level of the second sound of the first background sound in accordance with the second output value defined by the sound level control function means to generate the variation of the output ratio; and
 following the variation of the output ratio, setting the output level of the second background sound data to a given level to generate the second background sound and ending generation of the first background sound data.

* * * * *